United States Patent Office 2,947,687
Patented Aug. 2, 1960

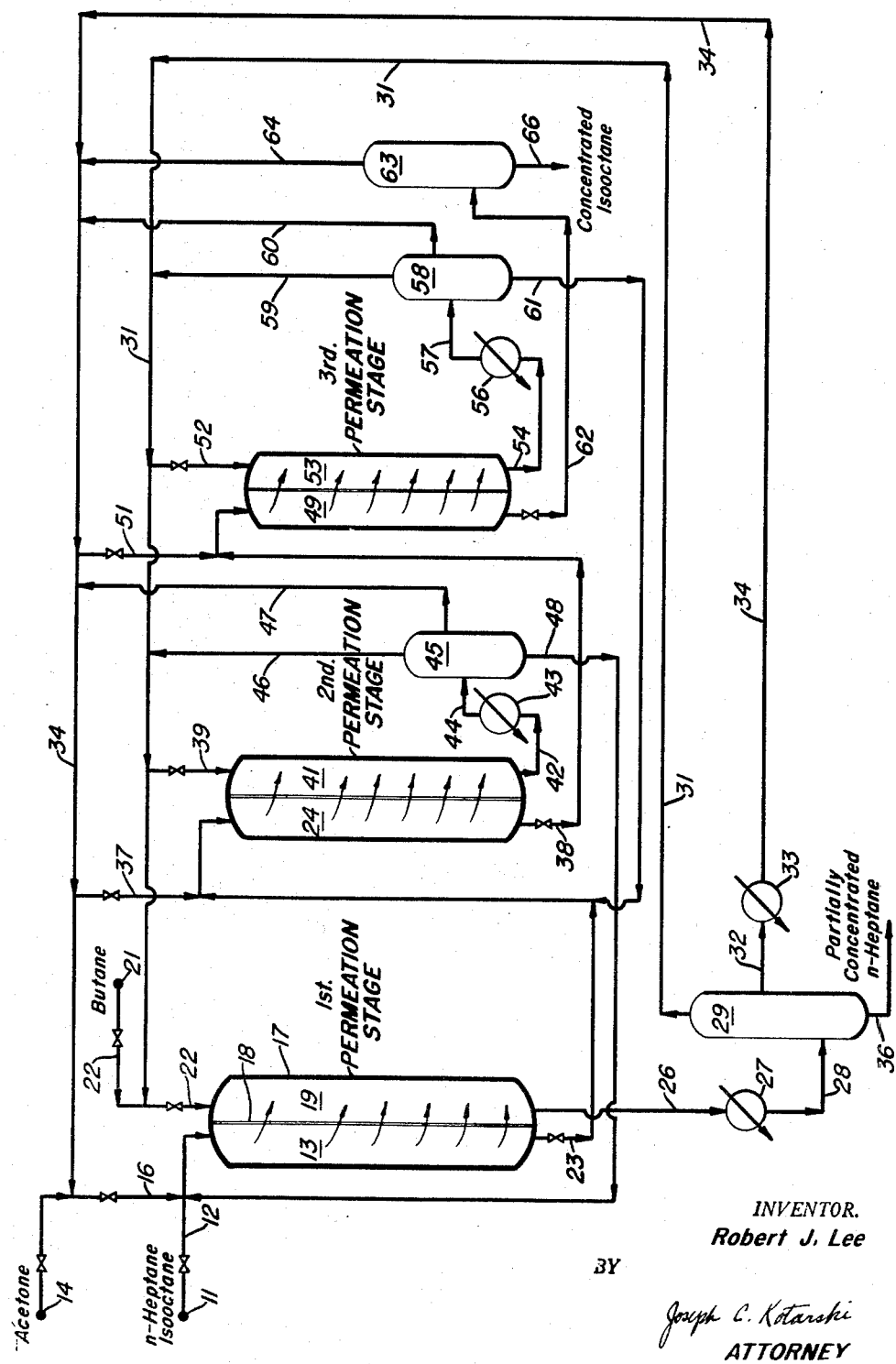

2,947,687

SEPARATION OF HYDROCARBONS BY PERMEATION MEMBRANE

Robert J. Lee, La Marque, Tex., assignor to The American Oil Company, a corporation of Texas Filed Oct. 29, 1954, Ser. No. 465,497

11 Claims. (Cl. 210—23)

This invention relates to an improvement in the separation of certain hydrocarbons from mixtures thereof with other hydrocarbons by permeation through a non-porous membrane and it pertains more particularly to methods and means for increasing the rate of permeation of hydrocarbons through the membrane.

It has been known that certain hydrocarbons could be separated from hydrocarbon mixtures by permeation through non-porous membranes of natural rubber, chloroprene, styrene polymer and the like but the permeation rates of hydrocarbons through such membranes were so low that the processes were commercially impracticable. As described and claimed in copending applications, certain types of cellulose ester membranes (Serial No. 443,894) and certain types of cellulose ether membranes (Serial Nos. 443,893 and 443,895) are remarkably effective for separating hydrocarbons according to type, and/or molecular configuration, and/or boiling point. Even with these improved non-porous membranes the permeation rates of certain hydrocarbons may be two low for practicable purposes; for example, normal heptane may be separated from a mixture thereof with isooctane but such separation is impracticable because of the very low permeation rate. An object of this invention is to provide an improved method and means for increasing the permeation rate of hydrocarbons through non-porous membranes which are capable of separating hydrocarbons according to type, and/or molecular configuration, and/or boiling point or molecular weight. A more specific object is to provide a method and means for separating gasoline boiling range hydrocarbon mixtures into fractions of high and low octane number, respectively, at such rates of permeation as to make the process commercially feasible. Other objects will be apparent in the course of the detailed description of the invention.

It has been discovered that when a hydrocarbon mixture is permeated through a non-porous membrane in which certain of the hydrocarbons contained in the mixture are more soluble than others, for the purpose of separating the mixture into different components, the rate of permeation can be greatly increased by contacting the membrane during the permeation process with a substituted hydrocarbon which is soluble in and has solvent power for the membrane. The substitued hydrocarbon is an organic compound containing one or more atoms of an element such as halogen, oxygen, sulfur, or nitrogen. These compounds are hereinafter referred to as substituted hydrocarbon solvents. The substituted hydrocarbon solvent is preferably of lower molecular weight and is preferably a normally liquid compound. Organic halogen compounds such as carbon tetrachloride, methylene chloride, ethylene dischloride, ethylene dibromide, dichloroethylene, trichloroethylene, trichlorofluoroethylene, butyl chloride, bromohydrin, fluorobenzene, and the like may be used as the substituted hydrocarbon solvent. Oxygen-containing organic compounds including alcohols such as ethanol, propanol, butanol and the like; ketones such as acetone, methyl ethyl ketone, methyl butyl ketone, cyclohexanone and the like; esters such as ethyl acetate, butyl acetate and the like; ethers such as ethyl ether and the like; carboxylic acids such as propionic acid and the like may be employed. Sulfur-containing organic compounds such as ethyl mercaptan, propyl mercaptan, butyl mercaptan, diethyl sulfide, methyl butyl disulfide, butyl sulfone and the like may be used. Nitrogen-containing organic compounds such as nitropropane, nitrobenzene, acetonitrile, formamide, butyl amine, ethylene diamine, ethylene cyanohydrin, ethylthiocyanate and the like may also be employed. It has been found that the substituted hydrocarbon solvents cause an increase in the rate of permeation of the hydrocarbons through the membrane without substantially altering the selectivity of the membrane for separating hydrocarbons. The substituted hydrocarbon solvents such as have been listed are not all equally effective in improving the permeation rates of hydrocarbons through the membrane. The particular substituted hydrocarbon solvent and the amount in which it is used will depend upon the improvement in the rate of permeation desired, the nature of the membrane, and the operating conditions employed in the permeation process. The amount of the substituted hydrocarbon solvent which may be employed may vary from about 1 to about 100% by concentration based upon the total mixture of solvent and hydrocarbons which are present in the zone to which the solvent is added. As the concentration of the solvent in the mixture which comes in contact with the membrane is increased, the rate of permeation of the hydrocarbons through the membrane is also increased. Because the substituted hydrocarbon solvent does have solvent power for the membrane it should not be employed in concentrations which are so high as to dissolve or weaken the membrane to the point of rupture under the particular operating conditions employed in the permeation process. The substituted hydrocarbon solvent may contact the membrane either on the feed side, the permeate side or both sides. It may contact the membrane while it is either in the liquid or vapor state. Preferably, the solvent is added to the hydrocarbon mixture which is undergoing permeation.

The method of separating materials by selective permeation through non-porous membranes has heretofore been described in the art. Copending applications Serial Nos. 443,893–4–5 set forth in detail the manner in which hydrocarbons can be separated by permeation through non-porous membranes. Briefly, a mixture of hydrocarbons is contacted with one side (feed side) of a thin (e.g. 0.1 to 10 mils) non-porous membrane in which certain of the hydrocarbons contained in the feed mixture are more soluble (preferentially permeatable) than others, a portion of the hydrocarbon mixture is permeated through the membrane, and permeated hydrocarbons which are enriched in those hydrocarbons more soluble in the membrane are recovered from the opposite side (permeate side) of the membrane. In practice, each separation stage comprises a vessel which is divided by the non-porous membrane into a feed zone for feed hydrocarbons and a permeate zone containing permeated hydrocarbons, each zone having separate draw-offs. In order for permeation to occur it is essential that the concentration of the preferentially permeatable hydrocarbons in contact with the membrane in the permeate zone be less than the concentration of such hydrocarbons in contact with the membrane in the feed zone. Under such conditions a portion of the feed hydrocarbons dissolve within the membrane and permaete therethrough. The permeated hydrocarbons can then be removed from the permeate side of the membrane as a mixture of the original hydrocarbon components but having a higher concentration (based upon total hydrocarbons permeated) of the preferentially permeatable hydrocarbons than the concentration of the preferentially permeatable hydrocarbons present in the initial hydrocarbon mixture employed as feed. The remaining non-permeated hydrocarbons present in the feed zone will have a lower concentration of the preferentially permeated hydrocarbons than was present in the feed and a lower concentration of these components than is present in the mixture of permeated hydrocarbons. Conversely, the remaining non-permeated hydrocarbons will be enriched in those hydrocarbons which are less soluble or less readily permeated through the membrane.

The permeation process may be conducted by contacting the feed hydrocarbon mixture in either the liquid or vapor state with the non-porous membrane and recovering permeated hydrocarbons from the opposite side of the membrane in either the liquid or vapor state. The permeated hydrocarbons should not be allowed to accumulate within the permeate zone to the extent that the concentration of the more readily permeatable hydrocarbons attain the same concentration in the medium of the permeate zone as they are present in the feed zone. To facilitate rapid permeation of hydrocarbons, the concentration of the permeated hydrocarbons at the surface of the membrane on the permeate side should be kept low by diluting permeated hydrocarbons in this zone with a diluent liquid or gas or by removing the permeated hydrocarbons. The diluent employed to reduce the concentration of permeated hydrocarbons in the permeate zone may be liquid or gaseous, depending upon the physical state of the permeated hydrocarbons, and should be separable from the permeated hydrocarbons by distillation or by other means. Examples of diluents are steam, air, butane and the like. A good method of operating the permeation process consists of maintaining the hydrocarbon in the feed zone in the liquid phase and removing permeated hydrocarbons in the vapor phase from the permeate zone, using a gaseous sweep to assist in removing the permeated hydrocarbons from the permeate surface of the membrane.

The permeation process may be operated as a batch or continuous operation. When operating continuously, the feed hydrocarbon mixture may be continuously or intermittently introduced into the feed zone, and non-permeated and permeated hydrocarbons are separately withdrawn either continuously or intermittently from the feed and permeate zones respectively. The rate of introduction of the feed and the removal of non-permeated hydrocarbons may be adjusted to provide the desired amounts of permeated and non-permeated hydrocarbons. Of course, only a portion of the feed hydrocarbon mixture should be permeated or else no separation of the hydrocarbons will be obtained. A number of permeate stages may be employed. Permeated or non-permeated hydrocarbons may be recycled to the various zones. In each zone the membrane may be used in the form of sheeting or tubing or in any other manner which preferably provides a maximum amount of membrane surface to volume ratio.

In operating the permeation process the concentration of the preferentially permeatable hydrocarbon should be lower in the permeate zone than it is in the feed zone. When operating with gaseous phases on both sides of the membrane this may conveniently be accomplished by maintaining a higher absolute pressure in the feed zone than in the permeate zone. Pressure differentials of from 10 mm. Hg to as high as 100 p.s.i.g. or higher may be used, depending upon the strength of the membrane. The pressure in the particular zone may thus vary from subatmospheric to superatmospheric. It is preferred to maintain the permeate zone at subatmospheric pressures so that the permeated hydrocarbons may be easily evaporated from the permeate side of the membrane and removed from the permeate zone in the vapor state. When operating in accordance with the preferred technique of maintaining hydrocarbons in the liquid phase in the feed zone and hydrocarbons in the permeate zone in the vapor phase, the feed zone may suitably be maintained at atmospheric pressure or somewhat higher and the permeate zone may be maintained at a subatmospheric pressure so that permeated hydrocarbons are readily removed from the permeate side of the membrane and then removed from the permeate zone.

The membrane employed is non-porous, i.e. free from holes or other defects which destroy a continuous surface. If the membrane has pin holes or the like which allow hydrocarbons to leak through, the selectivity of the permeation process is reduced or eliminated. The membrane should be as thin as possible and yet retain sufficient strength and stability to be useful in the permeation process. Ordinarily it may be from about 0.1 to 10 mils in thickness. Higher rates of permeation are obtained as the thickness of the membrane is decreased. Supports such as fine mesh wire screen, porous sintered metals or ceramic materials may be used as backing or supporting means to assist in minimizing the chances of rupturing the membrane while yet employing as thin a membrane as possible. The membrane must be one in which certain hydrocarbons are more soluble than others. Examples of such selective membranes are those comprised of natural or synthetic rubber such as gum rubber, chloroprene or neoprene rubber, vinyl polymers such as styrene polymer, polyisobutylene whose constituents have an average molecular weight higher than about 10,000, certain cellulose esters such as are described in detail on page 1, line 22, to page 4, line 17, of copending application Serial No. 443,894 and claimed therein for such purpose, and certain cellulose ethers such as are described in detail on page 1, line 22, to page 4, line 19, of copending application Serial No. 443,893 and claimed therein for the purpose of selectively permeating certain hydrocarbons. The preferred membrane is comprised of ethyl cellulose having an ethoxyl content between 40 to 47% by weight. A membrane comprised of cellulose acetate-butyrate having an acetyl content of about 5 to 15% and a butyryl content of 35 to 60% may also be used although lower permeation rates are obtained. The membranes described supra are not necessarily equivalent to each other in regard to rate of permeation and selectivity, and it is only necessary that the membrane be capable of selective permeation.

The hydrocarbon mixture which may be employed as the feed to the permeation process may be a natural or synthetic mixture of hydrocarbons. Minor amounts of impurities may be present therein. Hydrocarbon mixtures can be separated into fractions having differing concentrations of hydrocarbons of a particular type, i.e. aromatics, unsaturated and saturated hydrocarbons. In general, the various types of hydrocarbons permeate more rapidly through the membrane in the following order: saturated hydrocarbons, unsaturated hydrocarbons and aromatic hydrocarbons. Hydrocarbons can be separated according to the structural configuration of the hydrocarbon molecules present in the feed. Thus hydrocarbons can be separated according to their molecular configuration into fractions enriched in cyclic-, branched-chain, and straight-chain hydrocarbons, the particular configuration permeating more rapidly through the membrane in the order listed when the hydrocarbons have the same number of carbon atoms (if of the same boiling point the order of increasing permeation rates is branched-chain, cyclic-chain and straight-chain). The more highly branched hydrocarbons permeate less readily than do the hydrocarbons having a lesser degree of branching, and consequently a separation between them can be effected. Separation according to molecular configuration is particularly effective when the hydrocarbons are of the same type such as either olefins or paraffins. A separation can also be made between hydrocarbons according to their molecular weight, the lower molecular weight hydrocarbon generally permeating through the membrane more rapidly than the higher molecular weight hydrocarbon. The hydrocarbon mixture is preferably one boiling in the gasoline boiling range. For example, a naphtha fraction may be separated into fractions having higher and lower octane numbers than the feed mixture. The separation of hydrocarbons according to type or molecular configuration is most strikingly performed upon a feed which is a narrow boiling mixture of hydrocarbons, e.g. boiling within a range of about 30° C. or less, which preferably boils within the gasoline boiling range. When employing the substituted hydrocarbon solvent for the membrane to improve the rate of permeation, greater improvements in the permeation rate can be obtained when the feed is lean or is substantially free of aromatic hydrocarbons and unsaturated hydrocarbons. A preferred feed stock is comprised essentially of saturated hydrocarbons boiling within the gasoline boiling range and having a boiling range of about 30° C.

By contacting the membrane during the permeation step with a substituted hydrocarbon solvent for the membrane the rate of permeation can be increased. In certain instances the use of a substituted hydrocarbon solvent improves the selectively of the separation which is obtained, whereas in other instances the selectivity is substantially not altered or only slightly diminished. The substituted hydrocarbon solvents are organic compounds which are soluble in and have solvent power for the membrane and which contain at least one atom such as a halogen, oxygen, sulfur, or nitrogen atom. They may be considered to be hydrocarbons into which an element, such as have been listed supra, is introduced, thus the term substituted hydrocarbon solvent. Organic halogen compounds which are soluble in the particular membrane and have solvent power therefore may be used as the substituted hydrocarbon solvent. Compounds such as carbon tetrachloride, methylene chloride, ethylene dichloride, ethylene dibromide, dichloroethylene, trichloroethylene, trichlorofluoroethylene, butyl chloride, bromohydrins, fluorobenzene, and the like may be employed. Oxygen-containing organic compounds which likewise dissolve in the membrane and exert a solvent power or action on the membrane may be employed. For example, alcohols such as ethanol, propanol, butanol and the like; ketones such as acetone, methyl ethyl ketone, methyl butyl ketone, cyclohexanone, acetonyl acetone, mesityl oxide and the like; esters such as ethyl acetate, butyl acetate and the like; ethers such as ethyl ether, tetrahydrofuran, dioxane, methyl Cellosolve and the like; carboxylic acids such as propionic acid and the like may be employed. Sulfur-containing organic compounds, e.g. mercaptans such as ethyl mercaptan, propyl mercaptan, butyl mercaptan; thioethers such as diethyl sulfide; disulfides such as methyl butyl disulfide; sulfones such as butyl sulfone and similar compounds which are soluble in the membrane and have solvent power therefore may be employed. Nitrogen-containing organic compounds, e.g. nitroparaffins such as nitropropane; nitrobenzene; amines such as butyl amine, ethylene diamine; acetonitrile, ethylene cyanohydrin, ethylthiocyanate and similar compounds which dissolve in the membrane and have a solvent power therefore may be used. The various substituted hydrocarbon solvents are not equal in their effect in improving permeation rates of the hydrocarbons. Their effectiveness may differ remarkably when selective membranes of different composition are used. Among the preferred substituted hydrocarbon solvents are the oxygen-containing organic compounds, especially methyl ethyl ketone.

When the substituted hydrocarbon solvent comes in contact with the membrane it enables hydrocarbons to permeate the membrane more readily. The substituted hydrocarbon solvent may be introduced into the permeation step by adding it to the feed zone or the permeate zone in either a liquid or gaseous condition. Ordinarily the physical state of the substituted hydrocarbon solvent should be the same as for the hydrocarbons which are present in the zone to which it is added, it is preferred to introduce the substituted hydrocarbon solvent into the feed zone either by separate introduction or introduction along with the feed hydrocarbon mixture. A desirable method of operating consists of maintaining the feed hydrocarbon mixture and the added substituted hydrocarbon solvent in the liquid phase in the feed zone and recovering permeated hydrocarbons together with permeated substituted hydrocarbon solvent in the vapor phase in the permeate zone.

The amount of substituted hydrocarbon solvent which is employed to contact the membrane during the permeation step is a quantity which is sufficient to improve the rate of permeation of the hydrocarbons but insufficient to cause the membrane to weaken to the point of rupture under the operating conditions employed in the permeation process. The amount of solvent used will vary with the increase in permeation desired, the composition of the membrane employed, the particular solvent used, and the operating conditions in the permeation process, i.e., the composition of the hydrocarbons, the physical state of the feed and the permeate, the temperature, the pressure, and the pressure differential. In general, the amount added may be such that the concentration of the substituted hydrocarbon solvent (based upon the total amount of solvent and hydrocarbons present in the particular zone to which the substituted hydrocarbon solvent is added) may vary from 1 to 100; the higher the concentration of the solvent, the greater is the increase in the rate of permeation of the hydrocarbons. Under a given set of permeation operating conditions as the concentration of the solvent is increased the membrane begins to soften slowly until it is severely softened, then gels, and finally dissolves in the mixture of hydrocarbons and substituted hydrocarbon solvent. As the substituted hydrocarbon solvent dissolves within the membrane, it can frequently be observed that the membrane swells. At this stage it is believed the major effect of the solvent for increasing the permeation rate of hydrocarbons through the membrane has been achieved. A further increase in the concentration of the solvent will greatly increase the danger of weakening the membrane to the point of rupture. When substituted hydrocarbon solvent in the vapor phase contacts the membrane its solvent power for the membrane is not as great as it would be if it were in the liquid phase. Consequently, the concentration of the vapors of the substituted hydrocarbon solvent in contact with the membrane may be greater without causing the membrane to weaken to the point of rupture.

The operating temperature of the permeation process also has a bearing upon the stability of the membrane which is in contact with the substituted hydrocarbon solvent. It may vary between 0 to 250° C. depending, of course, upon the particular membrane used, the particular substituted hydrocarbon solvent employed, the concentration of the solvent in contact with the membrane, and the composition of the hydrocarbons in contact with the membrane. In general, as the temperature is increased the rate of permeation of hydrocarbons through the membrane is also increased, but the stability of the membrane is decreased and there is a danger of the membrane rupturing. Somewhat lower temperatures are therefor used when operating the permeation process in the presence of the substituted hydrocarbon solvent than would be used when operating in its absence.

The various concentrations of the particular substituted hydrocarbon solvent and the permeation temperatures which may be used can be determined by a few simple tests. While maintaining the temperature constant, a sample of the particular membrane to be used is immersed in a beaker containing the hydrocarbon mixture to be permeated. The particular substituted hydrocarbon solvent to be used is then added slowly to the beaker while stirring, and the physical conditions of the membrane is observed. As the membrane swells or becomes somewhat softend, the concentration of the substituted hydrocarbon solvent in the hydrocarbon mixture is then noted. This concentration is preferably not exceeded in the liquid mixture employed as the permeation charge at the particular temperature at which the test was conducted, for to do so would cause serious danger of the membrane rupturing. The effect of temperature on the stability of the membrane can be determined by employing a constant concentration of the same substituted hydrocarbon solvent in the same hydrocarbon mixture and gradually raising the temperature while observing the physical condition of the same membrane for the same softening effect. The temperature at which the membrane becomes noticeably softened is one which preferably should not be exceded when permeating this liquid mixture of the hydrocarbons and substituted hydrocarbon solvent through the membrane because of the danger of the membrane rupturing. Similarly, these concentrations of substituted hydrocarbon solvent and temperatures are preferably not exceeded in the permeate zone when permeated hydrocarbons and substituted hydrocarbon solvent are contained therein in the liquid phase. Somewhat higher concentrations of substituted hydrocarbon solvent and/or higher temperatures may be employed if the mixture of hydrocarbons and solvent contacts the membrane while in the vapor state. Simple tests of the type described may be used to determine these concentrations and temperatures while maintaining the mixture of hydrocarbons and substituted hydrocarbon solvent in the vapor state in contact with the membrane.

When employing a membane comprised of cellulose acetate butyrate (having a butyryl content of 40–50% and an acetyl content of 5–15%), it is preferred to employ methyl ethyl ketone as the substituted hydrocarbon solvent. When operating in accordance with the preferred method of maintaining feed hydrocarbons and added solvent in the liquid phase and removing permeated hydrocarbons and permeated solvent from the opposite side of the membrane in the vapor phase, a permeation temperature of 0 to 90° C. and a concentration of up to 5% by volume of added methyl ethyl ketone in the feed hydrocarbons is preferred. When the membrane is comprised of a cellulose ether such as ethyl cellulose having an ethoxyl content of 40 to 47%, the preferred substituted hydrocarbon solvent is acetone. It may be added to the feed hydrocarbons in up to about 5% by volume, and the permeation process operated at a temperature of about 0 to 80° C. When a synthetic rubber-type membrane is employed, ethylene dichloride is the preferred substituted hydrocarbon solvent. It is added to the feed in concentrations up to about 10% by volume, and the permeation process is operated at a temperature of about 0 to 100° C.

The substituted hydrocarbon solvent used is preferably one which is easily separable from the feed and permeated hydrocarbons. It preferably has a boiling point differing from that of the hydrocarbon feed and permeated hydrocarbons so that it can be separated therefrom by fractionation. Often the substituted hydrocarbon solvent can be extracted from the feed or permeated hydrocarbons by washing with water and then distilling the solvent from the aqueous solution thereof. Recovered substituted hydrocarbon solvent can then be reused. In multi-stage operations wherein either the permeated hydrocarbons or the non-permeated hydrocarbons are sent to later or earlier permeation stages as a portion of the feed, it may be desirable to allow the substituted hydrocarbon solvent to remain in the fraction which is sent to the later or earlier permeation stage; provided the proper concentration of solvent in the hydrocarbons in contact with the membrane can be maintained in the desired operating range.

A number of experiments were performed which demonstrate the effectiveness of the substituted hydrocarbon solvent in improving the rate of permeation of a mixture of saturated hydrocarbons through non-porous selective membranes. In these experiments a permeation cell, whose construction and manner of operation is described in detail in copending application Serial No. 443,894 (page 15, line 9, to page 16, line 25) was used. The apparatus comprised a chamber in which was suspended a box-like membrane holder. The total amount of membrane surface effective for permeation was 22 square inches. The membrane holder had 5 open faces which were tightly covered (leak proof) with the membrane. The chamber functioned as the feed zone and it had provisions for introducing and withdrawing the feed and non-permeated hydrocarbons, respectively. The interior of the box-like membrane holder functioned as the permeate zone and is connected with a line for withdrawing permeated hydrocarbons and recovering the same. The permeate zone was sealed off from the feed zone so that no hydrocarbons could enter the permeate zone except by permeating the membrane. Provisions were made in the apparatus for sweeping the permeate surface of the membrane with a sweep gas. Pumps were so associated with the apparatus that any range of pressures from subatmospheric to atmospheric could be maintained in either the feed zone or the permeate zone.

The permeation cell was employed to separate methylcyclohexane from an equal volume mixture of methylcyclohexane with isooctane in the absence and in the presence of methyl ethyl ketone as the substituted hydrocarbon membrane solvent. When using methyl ethyl ketone it was contained in the feed hydrocarbon mixture at a concentration of 5% by volume. The membrane employed was Tennessee Eastman Cellulose AB–500–5 (cellulose acetate butyrate having a butyryl content of about 48% and an acetyl content of about 7%) having a thickness of about 1.5 mils. The hydrocarbons and substituted hydrocarbon solvent were maintained in the liquid phase in the feed zone and in the vapor phase in the permeate zone. Permeation temperatures of 52° C. and 82° C. were used. A pressure differential of about 400 mm. Hg was maintained across the membrane, the absolute pressure in the permeate zone being about 35 mm. Hg and the absolute pressure in the feed zone being about 435 mm. Hg. Approximately 1400 ml. of hydrocarbons were introduced as the feed. The various mixtures employed in each run were permeated through the membrane until approximately a steady rate of permeation had been attained, usually between 1 to 6 hours. The amount of permeated hydrocarbons recovered varied from about 6 to 36 ml. depending upon the time and rate of permeation. Table I below sets forth data which were obtained.

*Table I*

| Run No. | Temperature, °C. | Charge Composition, Volume Percent | Permeate Composition, Volume Percent | | Permeation Rate,[1] Solvent-Free Basis |
| --- | --- | --- | --- | --- | --- |
| | | | Total Basis | Solvent-Free Basis | |
| 1 | 52 | 50 MCH / 50 Isooct. | 85 MCH / 15 Isooct. | 85 MCH / 15 Isooct. | 0.7 |
| 2 | 52 | 47.5 MCH / 47.5 Isooct. / 5.0 Solvent | 29 MCH / 11 Isooct. / 60 Solvent | 73 MCH / 27 Isooct. | 2.3 |
| 3 | 82 | 50 MCH / 50 Isooct. | 78 MCH / 22 Isooct. | 78 MCH / 22 Isooct. | 1.6 |
| 4 | 82 | 47.5 MCH / 47.5 Isooct. / 5.0 Solvent | 39 MCH / 13 Isooct. / 48 Solvent | 75 MCH / 25 Isooct. | 5.0 |

[1] Gallons/hr./1,000 sq. ft. of membrane surface.

It can be seen from the data that addition of 5% by volume of methyl ethyl ketone to the feed hydrocarbon mixture causes the rate of permeation of the hydrocarbons to increase to about 3-fold, with only a small drop in selectivity. An attempt to employ methyl ethyl ketone in a concentration of 10% by volume based upon the total mixture of substituted hydrocarbon solvent and hydrocarbons in the feed zone resulted in rupturing of the membrane. It should be noted also that the higher hydrocarbon permeation rates were obtained at the higher temperatures. Thus, one should operate with as high a concentration and at as high a temperature as is possible without causing the membrane to become so weakened that it is easily ruptured.

An additional series of runs were performed using a permeation apparatus of the same type but of smaller size (1.8 sq. in. of membrane surface) than was employed in obtaining the data set forth in Table I. A Tennessee Eastman Cellulose AB-381 (cellulose acetate butyrate having a butyryl content of about 38% and an acetyl content of about 13%) membrane of about 1.1 mils thickness was used. In all the runs the feed hydrocarbons, which were an equal volume mixture of methylcyclohexane and isooctane, and the added substituted hydrocarbon solvent contacted the membrane while in the vapor state. n-Butanol and methyl ethyl ketone were employed as the substituted hydrocarbon solvents. Hydrocarbons and substituted hydrocarbon solvent which permeated the membrane were maintained in the vapor state in the permeate zone. Permeation temperatures of 45° to 56° C. were used. A pressure differential of about 157 mm. Hg was maintained across the membrane, the absolute pressure in the feed zone being about 166 to 172 mm. Hg and the absolute pressure in the permeate zone being about 10-14 mm. Hg. The volume of charge to the feed zone was approximately 200 ml. in all runs. The volume of permeated hydrocarbons ranged between 0.3 to 20 ml. Air was used to sweep the permeate surface of the membrane. Table II below sets forth the data which were obtained.

Table II

| Run No. | Temperature, °C. | Charge Composition, Volume Percent | Permeate Composition, Volume Percent | | Permeation Rate,[1] Solvent-Free Basis |
|---|---|---|---|---|---|
| | | | Total Basis | Solvent-Free Basis | |
| 5 | 56 | 50 MCH 50 Isooct | (2) | (2) | 1.1 |
| 6 | 55 | 33 MCH 33 Isooct 33 n-Butanol | 27 MCH 7 Isooct 66 n-Butanol | 80 MCH 20 Isooct | 4.7 |
| 7 | 55 | 40 MCH 40 Isooct 20 MEK | 16 MCH 6.5 Isooct 77.5 MEK | 71 MCH 29 Isooct | 15.8 |

[1] Gallons/hr./1,000 sq. ft. of membrane surface.
[2] Small amount did not permit analysis.

It should be noted from runs 6 and 7 that a four-fold and fourteen-fold increase, respectively, in the rate of hydrocarbon permeation was obtained by use of the substituted hydrocarbon solvent. An increase of such magnitude with no great loss in the selectivity of separation makes the separation of hydrocarbons by selective permeation through non-porous membranes a much more attractive process.

Another series of experiments were conducted employing an apparatus of a different type. In these experiments a coil of neoprene tubing having an inside diameter of one-fourth inch and a thickness of 62 mils was used as the membrane. A portion of the coil was disposed within a container for the feed hydrocarbon mixture. The interior of the tubing served as the permeate zone, and the solvent was continuously circulated therethrough while in the liquid state. One end of the tubing was connected to a reservoir containing substituted hydrocarbon solvent and the other end of the tubing had attached to it a pump for circulating the solvent from the reservoir through the tubing and back to the solvent reservoir. The container for the feed hydrocarbon mixture was charged with about 1000 ml. of the feed hydrocarbon mixture. Approximately 205 cm. of tubing was in contact with the hydrocarbon charge. This was equivalent to approximately 80.6 square inches of membrane surface in contact with the feed hydrocarbon. The volume of substituted hydrocarbon solvent which was continuously recirculated through the permeate zone was about 500 ml. Before the data for each run were collected, a break-in run of about 2 hours was made so that the rate of permeation had become approximately steady. The data for each run were then collected. The concentration of permeated hydrocarbons which accumulated in the recirculating substituted hydrocarbon solvent during the course of each run varied from about 3 to 10%. The permeated hydrocarbons were then separated from the solvent, measured, and analyzed. When methanol and acetone were employed as the solvent, the solvent was separated from the permeated thydrocarbons by adding approximately 1 to 2 volumes of water thereto and separating the hydrocarbon phase from the aqueous phase. In the experiments wherein cetane and decane (non-solvents) were employed in place of the substituted hydrocarbon solvents as standards for comparison, the permeated hydrocarbons were separated therefrom by distillation. In the runs, for which data are shown in Table III below, the feed consisted of a liquid mixture of about 66% toluene and 34% n-heptane. The temperature of permeation was maintained at about 35° C. The results obtained are shown below in Table III.

Table III

| Run No. | Charge Composition, Vol. percent | Solvent | Non-Solvent | Permeate Composition, Volume percent | Rate of Permeation [1] |
|---|---|---|---|---|---|
| 5 | 64.8 Toluene 35.2 n-Heptane | none | cetane | 70.3 Toluene 29.7 n-Heptane | 5.4 |
| 6 | 66 Toluene 34 n-Heptane | none | decane | 70.6 Toluene 29.4 n-Heptane | 6.3 |
| 7 | 66 Toluene 34 n-Heptane | methanol | none | 78.3 Toluene 21.7 n-Heptane | 9.2 |
| 8 | 66 Toluene 34 n-Heptane | acetone | none | 78.5 Toluene 21.5 n-Heptane | 15.0 |

[1] Gallons/hr./1000 sq. ft. of membrane surface.

It is apparent from the above data that by contacting the membrane during the permeation process with a substituted hydrocarbon solvent, the rate of permeation of hydrocarbons through the membrane is increased. It should be further noted that the selectivity of the membrane for permeating toluene is increased. Such improvements render the separation of hydrocarbons by the permeation process much more attractive from an economic viewpoint.

The invention will be more clearly understood by reference to the following specific example illustrated in the annexed drawing which forms a part of this specification and shows in schematic form one embodiment of the process of this invention for separating a mixture comprised of saturated hydrocarbons of differing molecular configuration into fractions enriched in hydrocarbons of a particular molecular configuration.

The feed employed in this illustration is comprised essentially of an equal volume mixture of n-heptane and isooctane. It is passed from source 11 at a temperature of about 70° C. by way of valved line 12 into the feed zone 13 of the first permeation stage. The substituted hydrocarbon solvent for the membrane, in this illustration acetone, is passed from source 14 by way of valved line 16 and at a temperature of about 70° C. into valved line 12 wherein it mingles with the saturated hydrocarbon feed and passes into feed zone 13 of the first permeation stage. As illustrated diagrammatically herein, the first permeation stage consists of a vessel 17 which is divided by a non-porous membrane 18 to form two vertical sections, one being the feed zone 13 and the other being the permeate zone 19. The non-porous membrane which is employed in each of the three stages of the embodiment described is comprised of Hercules Ethocel G-100 which is an ethyl cellulose membrane having an ethoxyl content of 44.5–45.5%. The thickness of the membrane used is 1.5 mils. Although not illustrated, each permeation stage may be comprised of a great number of individual permeation cells, each cell consisting of a feed zone separated by a non-porous membrane from a permeate zone. The particular form of apparatus used in each permeation stage may be widely varied and constitutes no particular part of this invention. Likewise, the membrane may be one which is supported in some manner to diminish the possibility of membrane rupture. The concentration of acetone in the mixture of normal heptane and isooctane in each stage is maintained at about 5% by volume. The feed zones of each permeation stage are maintained under a superatmospheric pressure of 30 p.s.i.a Under these conditions, the hydrocarbons and acetone in the feed zone are maintained in the liquid phase. The pressure maintained in the permeate zone of each permeation stage is about 100 mm. Hg abs. For purpose of clarity, the numerous pumps and other equipment necessary to maintain such conditions of pressure are not detailed herein. The mixture of acetone, normal heptane and isooctane is introduced into the feed zone of each permeation stage at a rate such that approximately ⅔ of the introduced hydrocarbons permeate the membrane and about ⅓ of the total hdrocarbons fed into each feed zone are removed as non-permeated hydrocarbons. Greater or lesser amounts of the introduced hydrocarbons may be allowed to permeate the membrane in each stage. Although not critically necessary, a sweep gas is employed in this illustration to assist in removing permeated hydrocarbons and solvent from the permeate side of the membrane. Butane from source 21 is admitted as a gas by way of valved line 22 into permeate zone 19 for this purpose.

The non-permeated hydrocarbons and acetone are removed from the first stage and passed by way of valved line 23 into feed zone 24 of the second permeation stage. This non-permeated fraction is enriched in isooctane and is depleted in normal heptane. It is also depleted in acetone. The permeated hydrocarbons and acetone together with the sweep gas butane are removed from permeate zone 19 and passed by way of line 26 to cooler 27. The mixture is then passed by way of line 28 into fractionator 29 wherein an overhead gaseous butane stream is separated and recycled by way of line 31 for use as the sweep gas in the various permeate zones. Acetone which tends to concentrate in the permeate fraction is also separated in fractionator 29 and is removed as a side stream by way of line 32. It is then passed to condenser 33 and recycled by way of line 34 as the solvent for the membrane used in the feed zones of the various permeation stages. Preferably the solvent recovered from the fraction of the permeate is recycled to the feed zone of the same permeation stage. A liquid bottoms fraction is removed from fractionator 29 by way of line 36. This liquid mixture is partially concentrated n-heptane containing a small proportion of isooctane. Additional acetone is added to the mixture in valved line 23 so that the concentration of acetone is 5% by volume in the three-component hydrocarbon mixture in feed zone 24 of the second permeation stage. The acetone introduced may be that introduced from source 14 by means not shown, or as in this illustration it may be acetone which has been recovered from the permeate fraction of the first permeation stage which is being cycled by way of line 34. Valved line 37 is employed to carry the additional amount of acetone needed from line 34 to line 23.

The non-permeated hydrocarbon mixture, which has become further depleted in n-heptane and acetone, is removed from feed zone 24 of the second permeation stage and is passed by way of valved line 38 into the feed zone of the third permeation stage. Recycled butane sweep gas is admitted from the butane recycling line 31 and is passed by way of valved line 39 into the permeate zone 41 of the second permeation stage. The permeated hydrocarbons and acetone together with the sweep gas butane are removed from permeate zone 41 and passed by way of line 42 to cooler 43. The mixture is compressed by means not shown and passed by way of line 44 into fractionator 45. Gaseous butane is recovered overhead from fractionator 45 and is passed by way of line 46 into the main butane recycling line 31. Acetone is removed from fractionator 45 as a side stream and is passed by way of line 47 to acetone recycling line 34. A bottoms fraction consisting of normal heptane and isooctane is recovered from fractionator 45 and is passed by way of line 48 into line 12 for the recovery of further amounts of the isooctane still remaining. Certain permeated hydrocarbons, after removal of sweep gas butane, can be recycled as a portion of the feed to the feed zone of previous permeation stages if the concentration of the hydrocarbons in the permeate fraction is approximately the same as that entering the feed zone of the earlier permeation stage. This enables a more complete recovery of the desired isooctane.

The non-permeated hydrocarbons and acetone removed from feed zone 24 of the second permeation stage are passed by way of valved line 38 into permeation zone 49 of the third permeation stage. These non-permeated hydrocarbons have become enriched in isooctane and depleted in normal heptane and acetone. Additional acetone is added to valved line 38 to increase the concentration of acetone in the hydrocarbons in feed zone 49 to about 5%. As illustrated here, the acetone is admitted from line 34, which carries recycled acetone, by way of valved line 51 into valved line 38. Butane sweep gas is admitted from line 31 by way of valved line 52 into permeate zone 53 of the third permeation stage. The permeated hydrocarbons and acetone together with butane are removed from permeate zone 53 and passed by way of line 54 into cooler 56. The cooled mixture is then compressed and sent by way of line 57 to fractionator 58. Gaseous butane is removed overhead from fractionator 58 and passed by way of line 59 into the butane recycling 31 for reuse. Acetone is removed from fractionator 58 as a side stream and is passed by way of line 60 to acetone recycling line 34. This liquid hydrocarbon mixture is enriched in isooctane and constitutes a valuable stream for recycle to the feed zone of the second permeation stage as illustrated herein.

The non-permeated hydrocarbons are removed from feed zone 49 and passed by way of valved line 62 into fractionator 63. This non-permeated fraction consists mostly of isooctane with only a small amount of acetone and normal heptane. Acetone is separated from this mixture and taken overhead and passed by way of line 64 into acetone recycling line 34. A highly concentrated isooctane fraction containing only a very small amount of normal heptane is recovered from fractionator 63 and is removed as a liquid bottoms product by way of line 66. This highly concentrated isooctane fraction is an excellent motor fuel or motor fuel blending agent. The concentrated normal heptane recovered from the system by way of line 36 provides a suitable feed material for aromatization to a higher octane number motor fuel. By means of this invention a highly efficient and rapid selective permeation of hydrocarbons is obtainable.

The use of hydrocarbon solvent such as aromatic or unsaturated hydrocarbons for improving the permeation rate of saturated hydrocarbons through selective non-porous membranes is the subject matter of copending application Serial No. 465,495, filed on even date herewith.

Thus having described the invention what is claimed is:

1. In the process of separating a mixture of at least two hydrocarbons by introducing said mixture into the feed zone of a permeation apparatus comprised of a feed zone which is sealed from a permeate zone by a thin plastic membrane in which one of the hydrocarbons contained in said hydrocarbon mixture is more soluble than others, in which process a portion of the mixture of hydrocarbons is permeated through said membrane into the permeate zone and the permeated portion is withdrawn from said permeate zone and a non-permeated portion is withdrawn from the feed zone, said permeated portion being enriched in the hydrocarbon which is more soluble in the membrane, the improvement which comprises increasing the rate of permeation of hydrocarbons through the membrane by introducing into the feed zone a substituted hydrocarbon solvent for said membrane, the introduced solvent being in addition to that normally occurring with the feed hydrocarbons, and carrying out the permeation in the presence of said substituted hydrocarbon solvent in an amount of the latter sufficient to substantially increase the rate of permeation of hydrocarbons through said permeation membrane, and thereafter separating said substituted hydrocarbon solvent from the permeated hydrocarbons.

2. The process of claim 1 wherein said substituted hydrocarbon solvent is added together with the mixture of hydrocarbons introduced into the feed zone.

3. The process of claim 1 wherein the substituted hydrocarbon solvent is separable by distillation from the hydrocarbons contained in said mixture of hydrocarbons.

4. The process of claim 1 wherein the mixture of hydrocarbons is a narrow boiling mixture.

5. The process of claim 1 wherein the mixture of hydrocarbons is comprised essentially of saturated hydrocarbons.

6. The process of claim 1 wherein the mixture of hydrocarbons and substituted hydrocarbon solvent is maintained in the liquid state in the feed zone and the permeated portion is withdrawn in the vapor state from the permeate zone.

7. The process of claim 1 wherein the mixture of hydrocarbons boils within the gasoline boiling range.

8. The process of claim 1 wherein said substituted hydrocarbon solvent is methyl ethyl ketone.

9. The process of claim 1 wherein said substituted hydrocarbon solvent is a low molecular weight alcohol.

10. The process of claim 1 wherein said substituted hydrocarbon solvent is ethylene dichloride.

11. In the process of separating a mixture of at least two hydrocarbons, said mixture being a narrow boiling mixture which boils within the gasoline boiling range and is substantially free of aromatic hydrocarbons by introducing said mixture into the feed zone of a permeation apparatus comprised of a feed zone which is sealed from a permeate zone by a thin plastic membrane in which one of the hydrocarbons contained in said hydrocarbon mixture is more soluble than others, in which process the mixture of hydrocarbons in the feed zone is maintained in the liquid state and a portion of the mixture of hydrocarbons is permeated through said membrane into the permeate zone and the permeated portion is withdrawn in the vapor state from said permeate zone and a non-permeated portion is withdrawn from the feed zone, said permeated portion being enriched in the hydrocarbon which is more soluble in the membrane, the improvement which comprises increasing the rate of permeation of hydrocarbons through the membrane by introducing into the feed zone a liquid substituted hydrocarbon solvent for said membrane, the introduced solvent being in addition to that normally occurring with the fed hydrocarbons, and carrying out the permeation in the presence of said substituted hydrocarbon solvent in an amount of the latter sufficient to substantially increase the rate of permeation of hydrocarbons through said permeation membrane, and thereafter separating said substituted hydrocarbon solvent by distillation from the permeated hydrocarbons.

References Cited in the file of this patent

UNITED STATES PATENTS

| | | |
|---|---|---|
| 2,159,434 | Frey | May 23, 1939 |
| 2,475,990 | Robertson | July 12, 1949 |

FOREIGN PATENTS

| | | |
|---|---|---|
| 355,294 | Great Britain | Aug. 21, 1931 |
| 445,345 | Great Britain | Sept. 20, 1935 |

OTHER REFERENCES

American Dyestuff Reporter for June 11, 1951, page 387.

Modern Plastics for June 1950, pp. 97, 98, 100, 102, 150–152, 154, 156, 158 (article by V. L. Simnil and A. Herschberger).

Modern Plastics for June 1951, page 107.

"Technique of Organic Chemistry," vol. III, Pt. I, "Separation and Purification," by Arnold Weissberger. First Ed., published by Interscience Publishers, 1956, pp. 41–47.